United States Patent [19]

Boehm et al.

[11] Patent Number: 5,606,905
[45] Date of Patent: Mar. 4, 1997

[54] DEVICE FOR COOKING FOODSTUFFS

[75] Inventors: Michael W. Boehm, Batavia; Robert W. Johnson, Naperville, both of Ill.

[73] Assignee: Tsann Kuen USA, Inc., Pasadena, Calif.

[21] Appl. No.: 371,288

[22] Filed: Jan. 11, 1995

[51] Int. Cl.[6] ............................................. A47J 37/06
[52] U.S. Cl. ........................ 99/375; 99/380; 99/400; 99/425; 99/446; 219/401; 126/369
[58] Field of Search ............................. 99/372, 375, 380, 99/400, 425, 444, 445, 446; 219/401, 524, 525, 415; 126/369, 20

[56] References Cited

U.S. PATENT DOCUMENTS

| | | |
|---|---|---|
| 113,886 | 4/1871 | Howard . |
| D. 347,548 | 6/1994 | Boehm et al. . |
| 1,422,835 | 7/1922 | Condy . |
| 1,471,039 | 10/1923 | Lee . |
| 1,517,161 | 11/1924 | Kershaw . |
| 1,697,384 | 1/1929 | Coutu ............................. 99/372 |
| 1,802,005 | 4/1931 | Detwiler . |
| 1,862,420 | 6/1932 | O'Brien . |
| 1,929,166 | 10/1933 | Freemon . |
| 1,956,387 | 4/1934 | Hartman . |
| 2,127,658 | 8/1938 | Walterspiel . |
| 2,321,676 | 6/1943 | Hennessy ......................... 99/425 |
| 2,411,993 | 12/1946 | Hobson . |
| 3,002,444 | 10/1961 | Hoebing . |
| 3,099,951 | 8/1963 | Tidman . |
| 3,245,337 | 4/1966 | White et al. ..................... 99/375 |
| 3,292,528 | 12/1966 | Myler . |
| 3,308,747 | 3/1967 | Spagnolo . |
| 3,330,204 | 7/1967 | Little . |
| 3,369,481 | 2/1968 | Pappas . |
| 3,418,921 | 12/1968 | Fautz . |
| 3,527,154 | 9/1970 | Shaper et al. . |
| 3,568,590 | 3/1971 | Grice . |
| 3,583,309 | 6/1971 | Freidenrich . |
| 3,664,256 | 5/1972 | Peirce . |
| 3,707,906 | 1/1973 | Marrie ............................. 99/372 |
| 3,719,507 | 3/1973 | Bardeau ......................... 99/375 |
| 3,842,726 | 10/1974 | Fautz . |
| 3,938,431 | 2/1976 | Potvin . |
| 3,989,028 | 11/1976 | Berger . |
| 4,034,663 | 7/1977 | Jenn et al. . |
| 4,091,720 | 5/1978 | Wheeler ......................... 99/372 |
| 4,164,175 | 8/1979 | Burstein et al. . |
| 4,598,634 | 7/1986 | Van Horn, II . |
| 4,862,795 | 9/1989 | Hawkins . |
| 4,972,766 | 11/1990 | Anetsberger ..................... 99/375 |
| 5,129,313 | 7/1992 | Coppier .......................... 99/372 |
| 5,154,115 | 10/1992 | Kian .............................. 99/380 |
| 5,363,748 | 11/1994 | Boehm et al. . |

*Primary Examiner*—David Scherbel
*Assistant Examiner*—James F. Hook
*Attorney, Agent, or Firm*—Welsh & Katz, Ltd.

[57] ABSTRACT

A cooking device including a lower cooking plate which is positioned at an angle to the horizontal plane of the device has grilling members supported in heat conducting relation and an upper cooking plate movable to a closed position forming a cooking chamber which substantially restrains the escape of vapors and permits the cooking and removal of small pieces or ground foodstuffs. In one embodiment, the device includes a collecting member positioned beneath a downwardly extending portion of the lower cooking plate, which can have an opening and through which liquids emitted from the foodstuffs during cooking can be removed, and into which the foodstuffs after cooking can be collected for removal from the device.

13 Claims, 4 Drawing Sheets

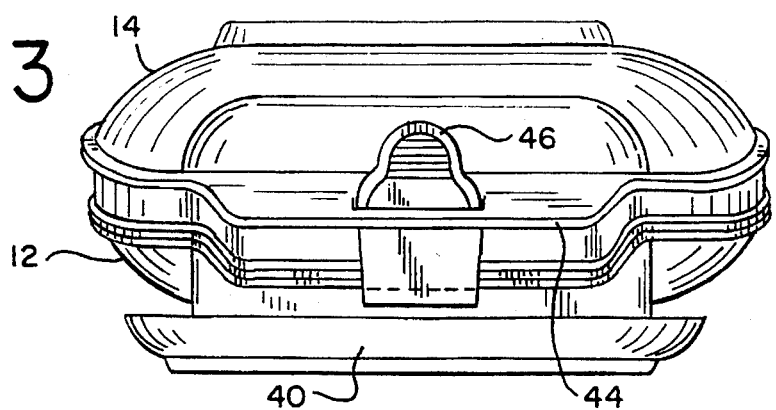
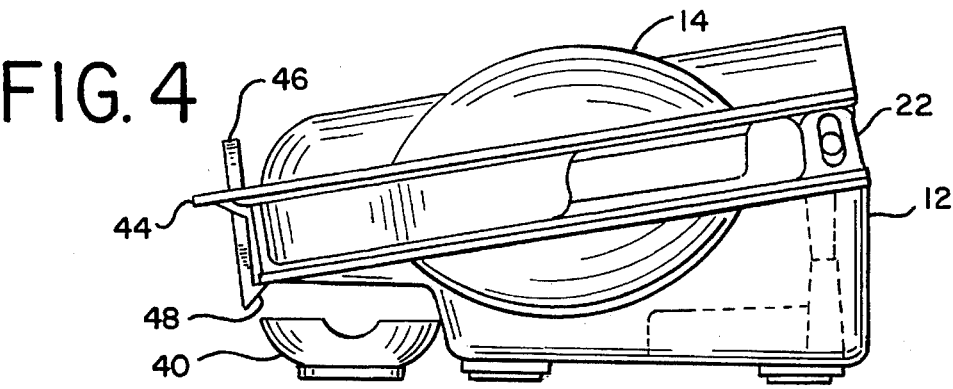
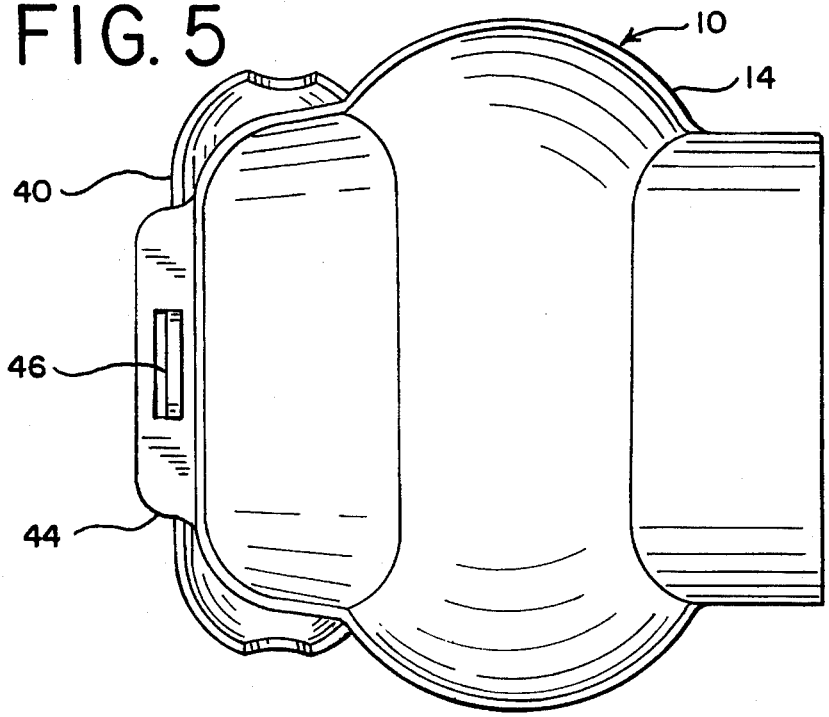

DEVICE FOR COOKING FOODSTUFFS

BACKGROUND OF THE INVENTION

This invention relates to electrical devices for cooking, and more particularly to electrical cookers which quickly cook foodstuffs such as meat, including hamburger, poultry breasts, hot dogs, and the like, as well as ground meats, or pieces of meat, hash brown potato patties, potato slices, fish fillets, sausage pieces, eggplant slices, and other foodstuffs.

Due to health concerns, there is a desirability to cook foods without the use of cooking oils, fats or similar substances, and to remove the grease and liquids emanating from the foodstuffs during cooking. One method of preparing foods without the former and removing the latter is by grilling the foods in a broiler. One of the disadvantages of this method is that the foods tend to loose moisture during the grilling resulting in poor taste. A second disadvantage is that the grilling does not add flavor to the foodstuffs, and thus to impart flavor, seasonings must be added to the surface of the food. A third disadvantage is that foodstuffs which are to be cooked in small pieces or ground foodstuffs cannot readily be grilled in devices which are presently available.

It is therefore an object of the present invention to provide a device which cooks foodstuffs without the need for oils, fats and similar substances and provides for the removal of grease and other liquid emanating from the foodstuffs from the immediate area of the foodstuffs.

It is another object of the present invention to provide a device which cooks foodstuffs and maintains the moisture content of the food during the cooking thereof.

It is a further object of the present invention to provide a device which permits the introduction of flavor into the foodstuffs.

It is a still further object of the present invention to provide a device in which grease and other liquids emanating from the foodstuffs being cooked can be readily removed from the cooking chamber of the device during and/or following cooking.

It is a still further object of the present invention to provide a device in which foodstuffs in the form of small pieces or ground foodstuffs can be cooked and readily removed from the device without tipping or turning over the device to remove the cooked food.

These and other objects and advantages of the present invention will be apparent from the following description.

SUMMARY OF THE INVENTION

Accordingly, the present invention provides a cooking device for cooking foodstuffs having a lower cooking plate, and an upper cooking plate movable relative to the lower cooking plate to a closed position in which the upper and lower cooking plates form a cooking chamber which substantially restrains the escape of vapor therefrom. The lower cooking plate is positioned within the device at an angle to the horizontal plane of the device, and supports a plurality of grilling members adapted to have a portion thereof contact foodstuffs placed thereon for cooking. The grilling members extend upwardly from the plane of said lower cooking plate and have at least their lower marginal end portions extending upwardly to a greater elevation above the lower cooking plate than the elevation of the opposite marginal portions of the grilling members above the lower cooking plate. The device includes at least one heating element operatively coupled to the lower cooking plate for supplying heat to the lower cooking plate to provide heat to the cooking chamber and the grilling members. The lower cooking plate further includes at least one downwardly extending portion into which liquid emitted by foodstuffs within the cooking chamber during cooking is directed.

In one embodiment of the present invention the lower cooking plate desirably has a well to contain liquid and heating means, such as a heating element, for supplying heat to said well for vaporizing at least a portion of the liquid in the well and for supplying vapor of the liquid to the cooking chamber during cooking. Optionally, the well is adapted to contain flavoring material, whereby flavoring material placed in said well can be vaporized in the well during cooking within the chamber. Desirably, the at least one downwardly extending portion of the lower cooking plate is the well for retaining liquid, and optionally the flavoring material, both of which can be heated by the heating means for supplying vapor thereof to the cooking chamber during cooking.

In another embodiment of the present invention, the at least one downwardly extending portion of the lower cooking plate of the device includes an opening therein at approximately its lowest point, whereby liquid emitted by foodstuffs within the cooking chamber during cooking therein is directed to the downwardly extending portion and through the at least one opening in the cooking plate. The device includes a collecting member positioned beneath the at least one opening in the lower cooking plate for collecting at least a portion of the liquid emitted by foodstuffs which passes through the at least one opening. Preferably the collecting member is separable from and replaceable with respect to the cooking plates for removing from the device liquid collected in the collecting member, and more preferably, the collecting member is readily accessible at the front of the device for removal therefrom.

In still another embodiment of the device of the present invention the at least one downwardly extending portion in said the lower cooking plate includes an opening therein, whereby food cooked in the cooking chamber can be removed from the chamber by being passed through the downwardly extending portion in the lower cooking plate and the opening therein. The device preferably includes a replaceable food collecting member positioned closely adjacent and beneath the at least one opening in the lower cooking plate, whereby food cooked in the cooking chamber can be collected in the food collecting member by being passed through the downwardly extending portion in the lower cooking plate and the opening therein into the food collecting member. Desirably the food collecting member is accessible at the front of the device for easy removal therefrom.

It is understood herein that the present invention includes having more than one downwardly extending portion in the lower cooking plate, and further that one of the downwardly extending portions can be a well as described above to retain liquid emanating from the foodstuffs being cooked, and optionally flavoring material placed therein, for supplying vapor thereof to the cooking chamber during cooking, or can be formed with an opening for removal of collected liquid in the manner described above. Additionally, another downwardly extending portion of the lower cooking plate can include an opening formed therein through which food can be passed to a food collecting member positioned beneath the opening for ready removal of the food from the device.

More particularly, in the device the upper cooking plate may include heating means, such as a heating element, for heating the upper cooking plate. The lower heating means may heat both the lower cooking plate and the well, if a well is present. The upper and lower cooking plates include peripheral rims configured to contact each other in a shingled overlapping configuration to enclose the cooking chamber and substantially restrain the escape of vapor therefrom. The cooking device also includes a floating hinge element which provides pivotal movement of the upper cooking plate relative to the lower cooking plate. The hinge element also allows the relative vertical distance between the upper cooking plate and lower cooking plate to vary to accommodate foods of various thicknesses, with the overlapping configuration of the peripheral rims maintaining the enclosure of the cooking chamber.

The present invention will be more fully understood from the accompanying drawings which are to be read in conjunction with the description of the preferred embodiments.

BRIEF DESCRIPTION OF THE DRAWINGS

FIG. 3 is a front elevational view of the device of FIG. 1;

FIG. 4 is a right side elevation of the device of FIG. 1; the left side elevation of the device is the mirror image of the right side elevation;

FIG. 5 is a top planar view of the device of FIG. 1;

DESCRIPTION OF THE PREFERRED EMBODIMENT

Figure 1:
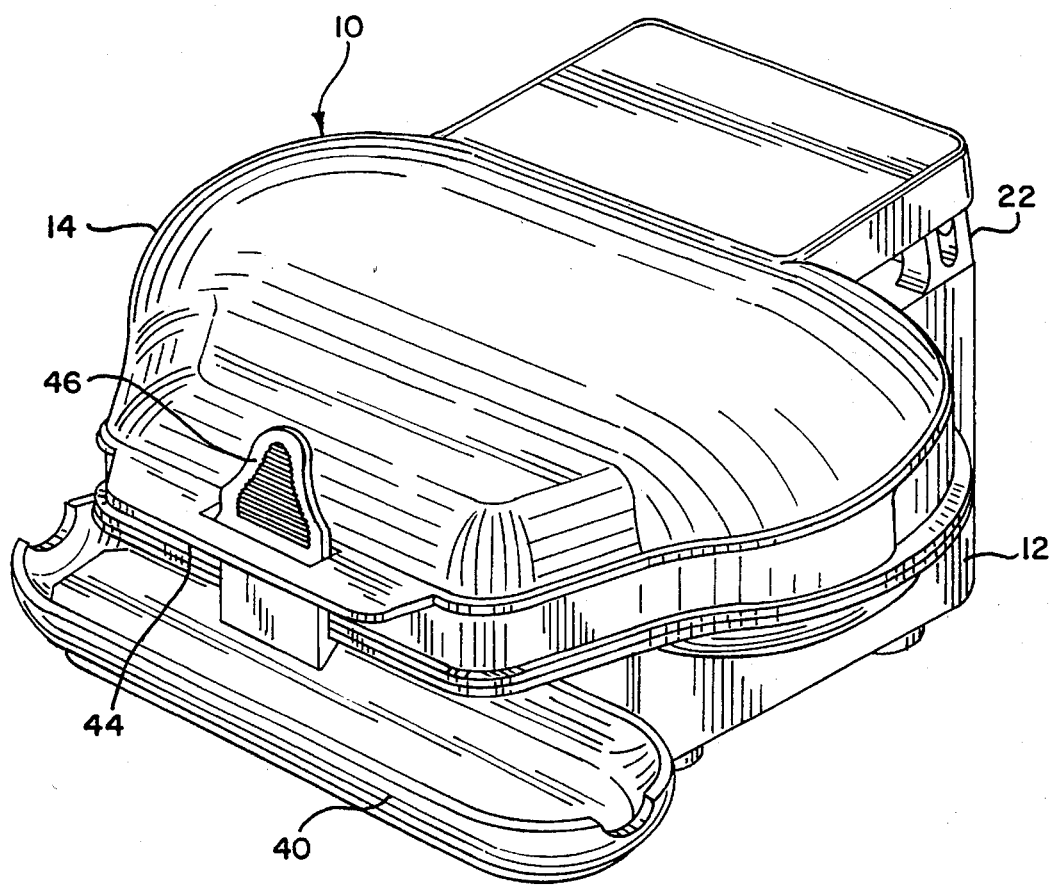
FIG. 1 is a front perspective view of a preferred embodiment of the device of the present invention.

FIG. 1 illustrates a first embodiment of a cooking device 10 constructed in accordance with the present invention. The apparatus 10 includes a base unit indicated at 12 and a upper unit indicated at 14. Base unit 12 includes a lower cooking plate 16. Upper unit 14 includes an upper cooking plate 18, the upper unit 14 being movable relative to lower cooking plate 16 to a closed position in which the upper cooking plate 18 and lower cooking plate 16 form a cooking chamber 20 (FIG. 7) which, due to the peripheries of the two cooking plates overlapping, substantially restrains the escape of vapor therefrom. The base unit 12 and upper unit 14 are pivotally connected by a floating hinge indicated at 22, such as the floating hinge shown and described in U.S. Pat. No. 5,363,748, issued Nov. 15, 1994, and assigned to the assignee of this application, which allows the top unit to move vertically, and to be pivotally moved relative to the base unit 12 from an open position (FIG. 2) to a closed position (FIG. 1). U.S. Pat. No. 5,363,748 also shows and describes the overlapping of the peripheries of upper and lower cooking plates to substantially restrain the escape of vapors.

Figure 2:
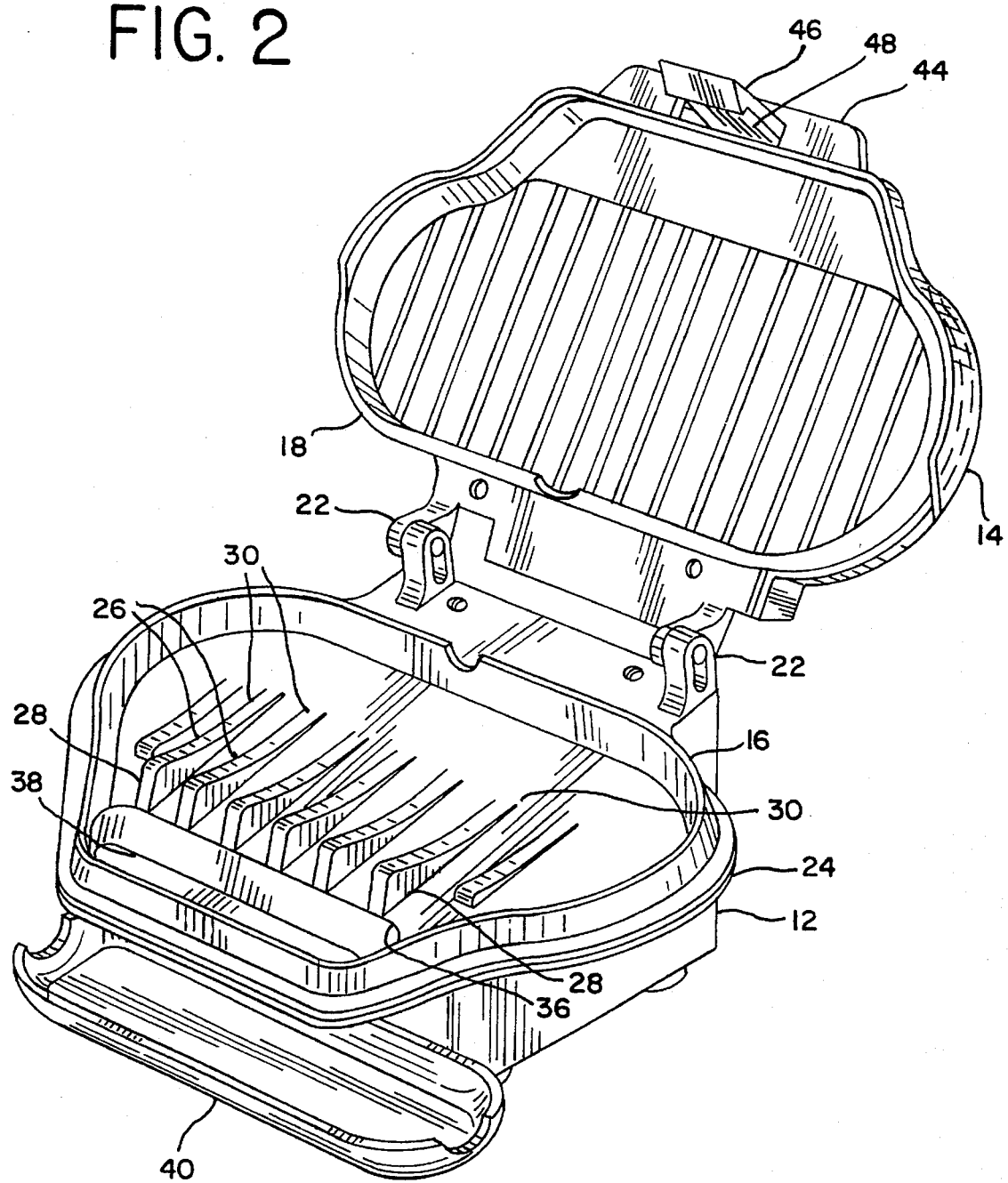
FIG. 2 is a front perspective view of the preferred embodiment of the device of the present invention shown in FIG. 1, with the cover of the device in the open position.
Figure 6:
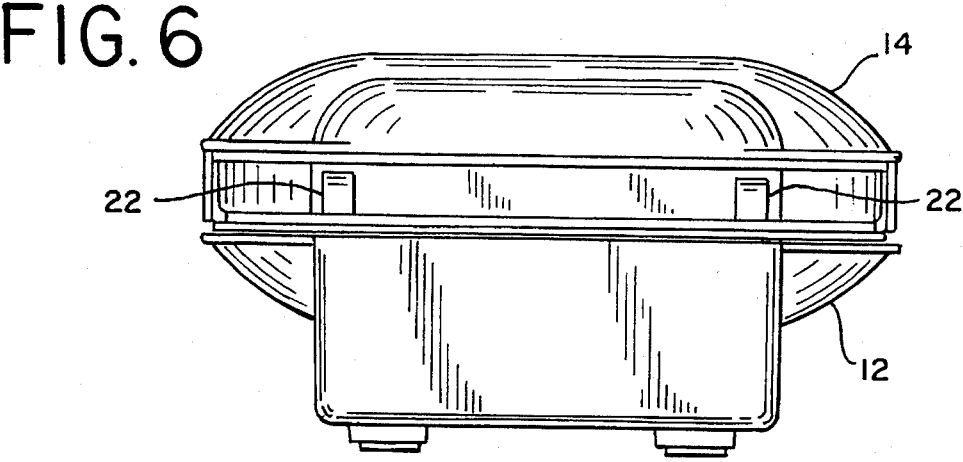
FIG. 6 is a rear elevation of the device of FIG. 1.

Referring to FIG. 2, the base unit 12 includes a lower housing 24 to which lower cooking plate 16 is secured, for example by bolts (not shown), to the top of the lower housing 24. Lower cooking plate 20 is positioned within device 10 and housing 24 at an angle to the horizontal plane of device 10, for example an angle of 12 degrees, although any acute angle to the horizontal plane of device 10 may be utilized. Lower cooking plate 16 supports a plurality of grilling members 26, which preferably are integral with plate 16, and are adapted to have a portion thereof contact foodstuffs placed thereon for cooking. Grilling members 26 extend upwardly from the plane of lower cooking plate 16 and have at least their lower marginal end portions 28 extending upwardly to a greater elevation above lower cooking plate 16 than the elevation of the opposite marginal portions 30 of grilling members 26 above lower cooking plate 16. Upwardly extending portions 28 of grilling members 26 prevent foodstuffs from sliding or otherwise moving down and off of inclined grilling members 24.

Device 10 includes at least one heating element 32 (FIGS. 7 and 8) operatively coupled to lower cooking plate 16 for supplying heat to lower cooking plate 16, grilling members 26 and cooking chamber 20. Upper cooking plate may also be heated by another heating element 34 (FIG. 7) in a similar manner. Lower cooking plate 16, by being positioned at an angle to the horizontal plane, causes liquid emitted by foodstuffs within cooking chamber 20 during cooking therein, to be directed toward the lower end thereof, and lower cooking plate 16 includes at least one downwardly extending portion 36, to which the liquid is directed.

Figure 9:
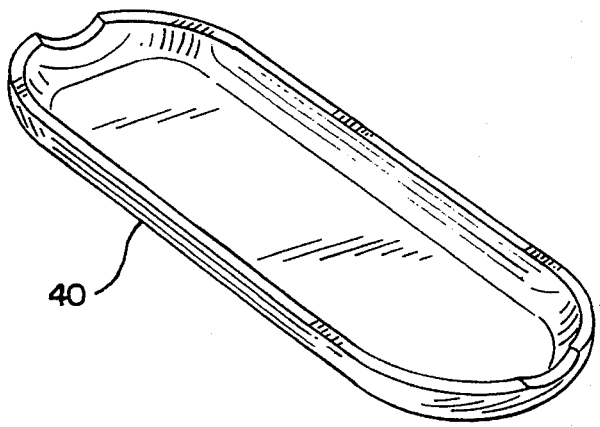
FIG. 9 is a front perspective view of a collecting member in accordance with the present invention.

In the embodiment of the present invention shown in FIGS. 1–7, the at least one downwardly extending portion 36 of lower cooking plate 16 includes an opening 38 therein at approximately its lowest point, whereby liquid emitted during cooking is directed to and through opening 38. Device 10 includes a collecting member 40 (FIG. 9) positioned beneath opening 38 in lower cooking plate 16 for collecting at least a portion of the liquid directed to downwardly extending portion 36 and passing through the opening 38. Preferably collecting member 40 is separable from and replaceable with respect to cooking plates 16 and 18 for removing from the device liquid collected in the collecting member 40, and more preferably, collecting member 40 is readily accessible at the front of device 10 for removal therefrom.

Figure 8:
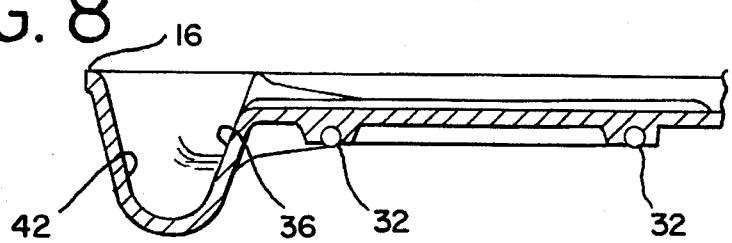
FIG. 8 is a cross-sectional elevational view of the lower cooking plate of another embodiment of the present invention.

In a second embodiment of the present invention, as particularly shown in FIG. 8, the lower cooking plate 16 desirably has a well 42 formed with downwardly extending portion 36 to contain liquid. Well 42 may include heating means (not shown), which may be a portion of heating element 32 or may be another heating element, for supplying heat to well 42 for vaporizing at least a portion of the liquid in the well and for supplying vapor of the liquid to cooking chamber 20 during cooking. Well 42 is also adapted to contain flavoring material (not shown), whereby flavoring material placed in well 42 can be vaporized therein during cooking within chamber 20.

Figure 7:
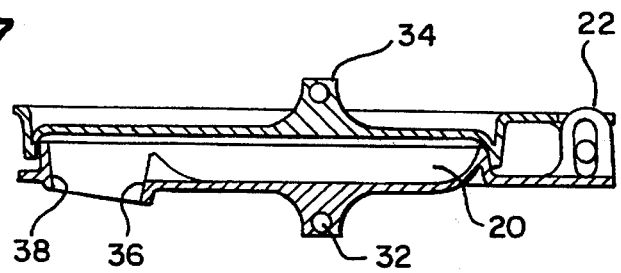
FIG. 7 is a is a cross-sectional elevational view of the lower and upper cooking plates of the device of the present invention shown in FIG. 1.

In a third embodiment of the device of the present invention, also as shown in FIG. 7, collecting member 40 is adapted to collect food therein, and is positioned beneath the at least one downwardly extending portion 36 in lower cooking plate 16 and opening 38. In this embodiment, food cooked in cooking chamber 20 can be removed from chamber 20 by being passed through downwardly extending portion 36 in lower cooking plate 16 and opening 38 therein. Collecting member 40 is preferably accessible at the front of device 10 for easy removal of food collected in member 40 therefrom.

It is understood herein that device 10 of the present invention having opening 38 and a collecting member, such as member 40, may provide for the removal of liquid and food, particularly foodstuffs in the form of cooked small pieces or ground foodstuffs. Removal thereof is effected by having liquid and grease emitted from the foodstuffs directed to and pass through opening 38 into member 40, and after cooking has been completed, first removing and disposing of the liquid and grease collected, and then replacing member 40 beneath opening 38, causing the cooked food to pass through opening 38 and into member 40 by being pushed, for example by a spatula (not shown), from grilling members 26 and plate 16, and then removing member 40 and tipping the food therefrom. In this manner cooked food can be removed from device 10 without tipping or turning over the device to remove the cooked food. Alternatively, cooking plate 16 can include more than one downwardly extending portion with one portion being a well, such as a well 42, and another of the downwardly extending portions with an opening, such as a portion with an opening 38, can be utilized for removing cooked food from the device. As described in connection with well 42 in the second embodiment above, the well in this embodiment can retain liquid emanating from the foodstuffs being cooked, and optionally flavoring material placed therein, for supplying vapor thereof to the cooking chamber during cooking, or can be formed with an opening (not shown) for removal of collected liquid in the manner described above.

Device 10 in the preferred embodiment of the present invention includes a handle 44 which extends outwardly from the front of upper unit 14 to facilitate rotating the latter away from base unit 12 to the open position and alternately toward base unit 12 to the closed position. Handle 44 supports a latch 46 which is pivotally mounted on handle 44. Latch 46 has a pawl 48, preferably integral with latch 46, at its lower portion which is adapted to engage the front edge of base unit 12 when upper unit 14 is in the closed position, as best shown in FIG. 4. Optionally, the front edge of base unit 12 may be indented (not shown) to receive pawl 48 of latch 46.

In operation, the cooker 10 is placed in the closed position with pawl 48 of latch 46 engaging the bottom of the front edge of base unit 12 as shown in FIGS. 1 and 3–6 and the electrical cord (not shown) is plugged into a suitable power source (also not shown) to preheat the lower cooking plate 16, and the upper cooking plate 18 if provided with a heating element, to the desired temperature. A thermostat and a regulator (not shown) may be used to control and select the desired temperature, as shown in U.S. Pat. No. 5,363,748.

The cooker 10 is then placed in the open position as shown in FIG. 2 by pushing latch 46 rearwardly to disengage pawl 48 from base unit 12 and lifting handle 44 and upper unit 14 from which handle 44 extends. A measured amount of liquid or solid containing flavor inducing components may be placed into well 42, if present in device 10. The food to be cooked is placed on grilling members 26 on lower cooking plate 16. The upper unit 14 is then pivotally moved to place the cooker 10 back into the closed position with pawl 48 engaging the bottom of the front edge of base unit 12, shown in FIGS. 1 and 3–6. If a timer control is present in the device, the control is then set for the desired cooking time. During cooking, grilling members 26 on lower plate 16 contact the food directly thereby transferring heat and creating grilling marks on the lower surfaces of the food. Also during cooking, the temperature of the cooking surfaces seals juices in the foodstuffs. If well 42 is present and is heated as heretofore described, liquid and flavoring materials disposed therein are caused to boil and give off vapor containing flavor inducing components. The vapor fills the cooking chamber 20 and penetrates the foodstuffs, contained therein, to moisten and flavor the foodstuffs. The overlapping configuration of upper cooking plate 18 and lower cooking plate 16 (FIG. 7) will force any vapor trying to escape from cooking chamber 20 to travel down the inner peripheries of the two plates. The forcing of vapor down the peripheries of the two cooking plates does not seal cooking chamber 20 but acts to substantially restrain the vapor within the chamber. Cooking juices given off by the foodstuffs during cooking drain toward downwardly extending portion 36 and into either well 42 or through opening 38, and may be vaporized in the former to add to the vapor present in the cooking chamber 20, or removed therefrom through the latter to collecting member 40.

After the desired cooking time is expired, the cooking device 10 is disconnected from the power source, and device 10 is then placed in the open position by disengaging pawl 48 from base unit 12 and lifting handle 44. If well 42 is present in device 10, then the food is removed from the lower cooking plate 16 and grilling members 26. If downwardly extending portion 36 includes an opening 38, and collecting member 40 is present, collecting member 40 can be removed from lower housing 24 and liquid collected therein can be removed from the member 40. If small pieces or ground foodstuffs were cooked in the device, then member 40 can be returned to its position beneath downwardly extending portion 36 and opening 38 of cooking plate 16, and the cooked foodstuffs can be pushed from grilling members 26 and plate 16 through portion 36 and opening 38 into collecting member 40, which can then be removed and the cooked foodstuffs removed therefrom.

A specific embodiment of the novel cooking device according to the present invention has been described for the purposes of illustrating the manner in which the invention may be made and used. It should be understood that implementation of other variations and modifications of the invention in its various aspects will be apparent to those skilled in the art and that the invention is not limited by the specific embodiment described. It is therefore contemplated to cover by the present invention any and all modifications, variations, or equivalents that fall within the true spirit and scope of the basic underlying principles disclosed and claimed herein.

What is claimed is:

1. A device for cooking foodstuffs comprising:
   a. a first cooking plate positioned at an angle to the horizontal plane of said device and supporting in heat conducting relation thereon a plurality of grilling members adapted to have a portion thereof contact foodstuffs placed thereon for cooking, said grilling members extending upwardly from the plane of said first cooking plate and having at least their lower marginal end portions upwardly curved and extending upwardly to a greater elevation above said first cooking plate than the elevation of the opposite marginal portions of the grilling members above said first cooking plate, whereby foodstuffs placed on said grilling members are retained by said upwardly curved end portions;
   b. a second cooking plate movable relative to said first cooking plate to a closed position to form with said first cooking plate a cooking chamber which substantially restrains the escape of vapor therefrom;
   c. at least one heating element operatively coupled to said first cooking plate for supplying heat to said first cooking plate to provide heat to said cooking chamber and said grilling members; and d. said first cooking plate including at least one downwardly extending portion for collecting liquid emitted by said foodstuffs within said cooking chamber during cooking therein.

2. The device of claim 1 wherein said grilling members are substantially parallel.

3. The device of claim 1 wherein the at least one downwardly extending portion of said first cooking plate is positioned at approximately the lowest point of said first cooking plate, whereby liquid emitted by foodstuffs being cooked in said device is directed to the said at least one downwardly extending portion.

4. The device of claim 1 wherein said at least one downwardly extending portion of said first cooking plate includes an opening therein at approximately its lowest point, whereby liquid emitted by foodstuffs being cooked in said device is directed to and through the at least one opening in said cooking plate, said device having a collecting member positioned beneath the at least one opening in said first cooking plate for collecting at least a portion of the liquid passing through the at least one opening.

5. The device of claim 4 wherein the collecting member is separable from and replaceable with respect to said cooking plates for removing from said device liquid collected in said collecting member.

6. The device of claim 5 wherein the collecting member is accessible at the front of the device for removal therefrom.

7. The device of claim 1 wherein said at least one downwardly extending portion in said first cooking plate includes an opening therein, whereby food cooked in said chamber can be removed from said chamber by being passed through said downwardly extending portion in said first cooking plate and the opening therein.

8. The device of claim 7 wherein said device includes a replaceable food collecting member positioned closely adjacent and beneath the at least one opening in said first cooking plate, whereby food cooked in said chamber can be collected in said food collecting member by being passed through said downwardly extending portion in said first cooking plate and the opening therein into said food collecting member.

9. The device of claim 8 wherein the food collecting member is accessible at the front of the device for removal therefrom.

10. A device for cooking foodstuffs comprising:

a. a first cooking plate positioned at an angle to the horizontal plane of said device and supporting in heat conducting relation thereon a plurality of grilling members adapted to have a portion thereof contact foodstuffs placed thereon for cooking, said grilling members extending upwardly from the plane of said first cooking plate and having at least their lower marginal end portions upwardly curved and extending upwardly to a greater elevation above said first cooking plate than the elevation of the opposite marginal portions of the grilling members above said first cooking plate, whereby foodstuffs placed on said grilling members are retained by said upwardly curved end portions;

b. a second cooking plate movable relative to said first cooking plate to a closed position to form with said first cooking plate a cooking chamber which substantially restrains the escape of vapor therefrom;

c. at least one heating element operatively coupled to said first cooking plate for supplying heat to said first cooking plate to provide heat to said cooking chamber and said grilling members; and d. said first cooking plate including at least one downwardly extending portion positioned at approximately the lowest point of said first cooking plate, whereby liquid emitted by foodstuffs within said cooking chamber during cooking therein is directed to the said at least one downwardly extending portion.

11. The device of claim 10 wherein said grilling members are substantially parallel.

12. The device of claim 10 wherein said at least one downwardly extending portion of said first cooking plate includes an opening therein at approximately its lowest point, whereby liquid emitted by foodstuffs within the cooking chamber during cooking is directed to and through the at least one opening in said cooking plate, said device having a collecting member positioned beneath the at least one opening in said first cooking plate for collecting at least a portion of the liquid passing through the at least one opening into the collecting member for removing from said device liquid collected in said collecting member.

13. A device for cooking foodstuffs comprising:

a. a first cooking plate positioned at an angle to the horizontal plane of said device and supporting in heat conducting relation thereon a plurality of grilling members adapted to have a portion thereof contact foodstuffs placed thereon for cooking, said grilling members extending upwardly from the plane of said first cooking plate and having at least their lower marginal end portions upwardly curved and extending upwardly to a greater elevation above said first cooking plate than the elevation of the opposite marginal portions of the grilling members above said first cooking plate, whereby foodstuffs placed on said grilling members are retained by said upwardly curved end portions;

b. a second cooking plate movable relative to said first cooking plate to a closed position to form with said first cooking plate a cooking chamber which substantially restrains the escape of vapor therefrom;

c. at least one heating element operatively coupled to said first cooking plate for supplying heat to said first cooking plate to provide heat to said cooking chamber and said grilling members;

d. said first cooking plate having at least one downwardly extending portion having an opening therein whereby liquid emitted by said foodstuffs within said cooking chamber during cooking therein passes through said opening; and e. said device including a replaceable food collecting member positioned beneath the at least one opening in said first cooking plate, whereby food cooked in said chamber can be collected and removed from said chamber by being passed through said downwardly extending portion in said first cooking plate and the opening therein into said food collecting member.

* * * * *